United States Patent
Bae (10) Patent No.: US 11,353,545 B2
(45) Date of Patent: Jun. 7, 2022

(54) SENSOR APPARATUS FOR VEHICLE

(71) Applicant: HYUNDAI MOBIS Co., Ltd., Seoul (KR)

(72) Inventor: Sang Hee Bae, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 280 days.

(21) Appl. No.: 16/809,416

(22) Filed: Mar. 4, 2020

(65) Prior Publication Data
US 2020/0292657 A1 Sep. 17, 2020

(30) Foreign Application Priority Data
Mar. 11, 2019 (KR) .................. 10-2019-0027566

(51) Int. Cl.
| G01S 7/02 | (2006.01) |
| G01S 7/521 | (2006.01) |
| G01S 13/931 | (2020.01) |
| G01S 13/00 | (2006.01) |

(52) U.S. Cl.
CPC ............... *G01S 7/02* (2013.01); *G01S 7/521* (2013.01); *G01S 13/931* (2013.01); *G01S 7/027* (2021.05); *G01S 2013/93275* (2020.01)

(58) Field of Classification Search
None
See application file for complete search history.

(56) References Cited

U.S. PATENT DOCUMENTS

| 5,844,471 | A | * | 12/1998 | Daniel | G01S 15/931 340/436 |
| 6,340,187 | B1 | * | 1/2002 | Villiere | B60R 19/483 293/155 |
| 8,411,532 | B2 | * | 4/2013 | Tsuzuki | G01S 7/521 367/188 |
| 8,988,281 | B2 | * | 3/2015 | Li | G01S 7/521 342/175 |
| 2006/0187756 | A1 | * | 8/2006 | Ho | B60R 19/483 367/99 |
| 2015/0123819 | A1 | * | 5/2015 | Chang | G01S 7/521 340/943 |

FOREIGN PATENT DOCUMENTS

| JP | 2005-022496 | 1/2005 |
| JP | 2013-067218 | 4/2013 |
| KR | 10-2017-0038173 | 4/2017 |

* cited by examiner

*Primary Examiner* — Bernarr E Gregory
(74) *Attorney, Agent, or Firm* — H.C. Park & Associates, PLC

(57) ABSTRACT

A sensor apparatus for a vehicle includes a protector, a holder, and a sensor. The protector is inserted into an insertion hole of a deck of the vehicle. The protector includes protector hooks formed thereon. The holder is inserted into the insertion hole and coupled to the protector so as to be constrained by the protector hooks. The holder includes holder hooks formed so as to be hooked to an inner surface of the deck. The sensor is coupled to the holder.

12 Claims, 11 Drawing Sheets

SENSOR APPARATUS FOR VEHICLE

CROSS-REFERENCE TO RELATED APPLICATION

This application claims priority to and the benefit of Korean Patent Application No. 10-2019-0027566, filed Mar. 11, 2019, which is hereby incorporated by reference for all purposes as if fully set forth herein.

BACKGROUND

Field

Exemplary embodiments generally relate to a sensor apparatus for a vehicle, and more particularly, to a sensor apparatus for a vehicle that can reduce the number of parts and assembling processes, and remove assembly tolerance.

Discussion

In general, a vehicle may have a sensor apparatus installed to sense an external object. Various types of sensor apparatuses may be applied depending on a method for measuring (or detecting) an external object. The sensor apparatus may be installed in a deck constituting, for instance, a bumper of the vehicle. A bolt may be welded to the deck. A sensor holder may be inserted into the bolt and a nut may be screwed to the bolt. A sensor may then be coupled to the sensor holder. As such, the sensor apparatus may be fixed to the deck by the bolt/nut fastening structure. However, since a conventional sensor apparatus includes the bolt, the nut, the sensor holder, and the sensor, the numbers of part and assembling processes may be increased. The increase in number of parts and assembling processes may raise not only the manufacturing time, but also the manufacturing cost. Further, since the bolt is typically welded to the deck and the nut is usually screwed to the bolt to assemble the sensor holder to the deck, the assembling time may be increased, and an assembly defect or assembly tolerance of the bolt and the nut may occur. Therefore, there is a need for a device capable of addressing these issues.

A conventional sensor retainer is disclosed in, for example, Korean Patent Application Publication No. 10-2017-0038173, laid-open on Apr. 6, 2017, and entitled "Sensor Retainer Assembly for Vehicle."

SUMMARY

Some aspects provide a sensor apparatus for a vehicle that is not only capable of reducing the number of parts and assembling processes, but also removing assembly tolerance.

Additional aspects will be set forth in the detailed description which follows, and, in part, will be apparent from the disclosure, or may be learned by practice of the inventive concepts.

According to some aspects, a sensor apparatus for a vehicle includes a protector, a holder, and a sensor. The protector is inserted into an insertion hole of a deck of the vehicle. The protector includes protector hooks formed thereon. The holder is inserted into the insertion hole and coupled to the protector so as to be constrained by the protector hooks. The holder includes holder hooks formed so as to be hooked to an inner surface of the deck. The sensor is coupled to the holder.

In an embodiment, the protector may include a protector body, a protector ring, and protector extension ribs. The protector body may be inserted into the insertion hole and maybe be coupled to the holder. The protector ring may be formed in a ring shape on the protector body so as to be contacted with an outer surface of the deck. The protector extension ribs may be extended from the protector body to an opposite side of the protector ring. Each of the protector extension ribs may include a protector hook among the protector hooks formed thereon.

In an embodiment, the protector body may include a through-hole into which a front portion of the sensor is inserted.

In an embodiment, the protector ring may protrude further from the outer surface of the deck than the front portion of the sensor to protector the sensor.

In an embodiment, the protector ring may include one or more tolerance removal ribs, which are elastically deformable. An extent of deformation of the one or more tolerance removal ribs may be at least dependent on a thickness of the deck.

In an embodiment, the one or more tolerance removal ribs may be formed in a ring shape along a circumference of the protector ring.

In an embodiment, the holder may include a holder body and holder extension ribs. The protector body may be coupled to the holder body. The holder body may include holder hook grooves to which the protector hooks are respectively hooked. The holder extension ribs may extended from the holder body to the opposite side of the protector ring. Each of the holder extension ribs may include a holder hook among the holder hooks formed thereon.

In an embodiment, each of the holder extension ribs may include a holder slit formed around the holder hook such that the holder hook is configured to elastically deform.

In an embodiment, the holder slit may be formed in a U-shape to surround the holder hook.

In an embodiment, the sensor may include one or more sensor hooks protruding from an outer surface thereof. Each of the holder extension ribs may include one or more holder constraint grooves to constrain the one or more sensor hooks.

In an embodiment, the insertion hole of the deck may include one or more concave position decision grooves formed therein. The holder body may include one or more position decision ribs configured to be inserted into the one or more position decision grooves of the insertion hole.

In an embodiment, the protector may be coupled to the holder and inserted into the insertion hole of the deck. The sensor may be coupled to the holder on an opposite side of the protector.

According to various exemplary embodiments, since a sensor apparatus for a vehicle may be constituted by a protector, a holder, and a sensor, the number of parts in the sensor apparatus for a vehicle and the manufacturing cost of the sensor apparatus for a vehicle can be reduced. Furthermore, the protector and the holder may be assembled and inserted into an insertion hole, and the sensor may be assembled to the holder. Therefore, it is possible to reduce the number of assembling processes and the assembling time of the sensor apparatus for a vehicle. Furthermore, a separate bolt and a separate nut do not need to be installed, and a bolt does not need to be welded to the deck to install the sensor apparatus for a vehicle in the deck. Therefore, the assembling process of the sensor apparatus for a vehicle can be simplified. In addition, since a protector ring may have a tolerance removal rib, which is elastically deformed depending on the thickness of the deck, the tolerance removal rib may be elastically deformed even though the deck has a slightly different thickness when the protector is assembled to the holder. Therefore, the assembly tolerance depending on the thickness difference of the deck can be removed, and the gap between the deck and the protector ring can be sealed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF SOME EXEMPLARY EMBODIMENTS

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, various exemplary embodiments of a sensor apparatus for a vehicle will be described with reference to the accompanying drawings.

Figure 1:
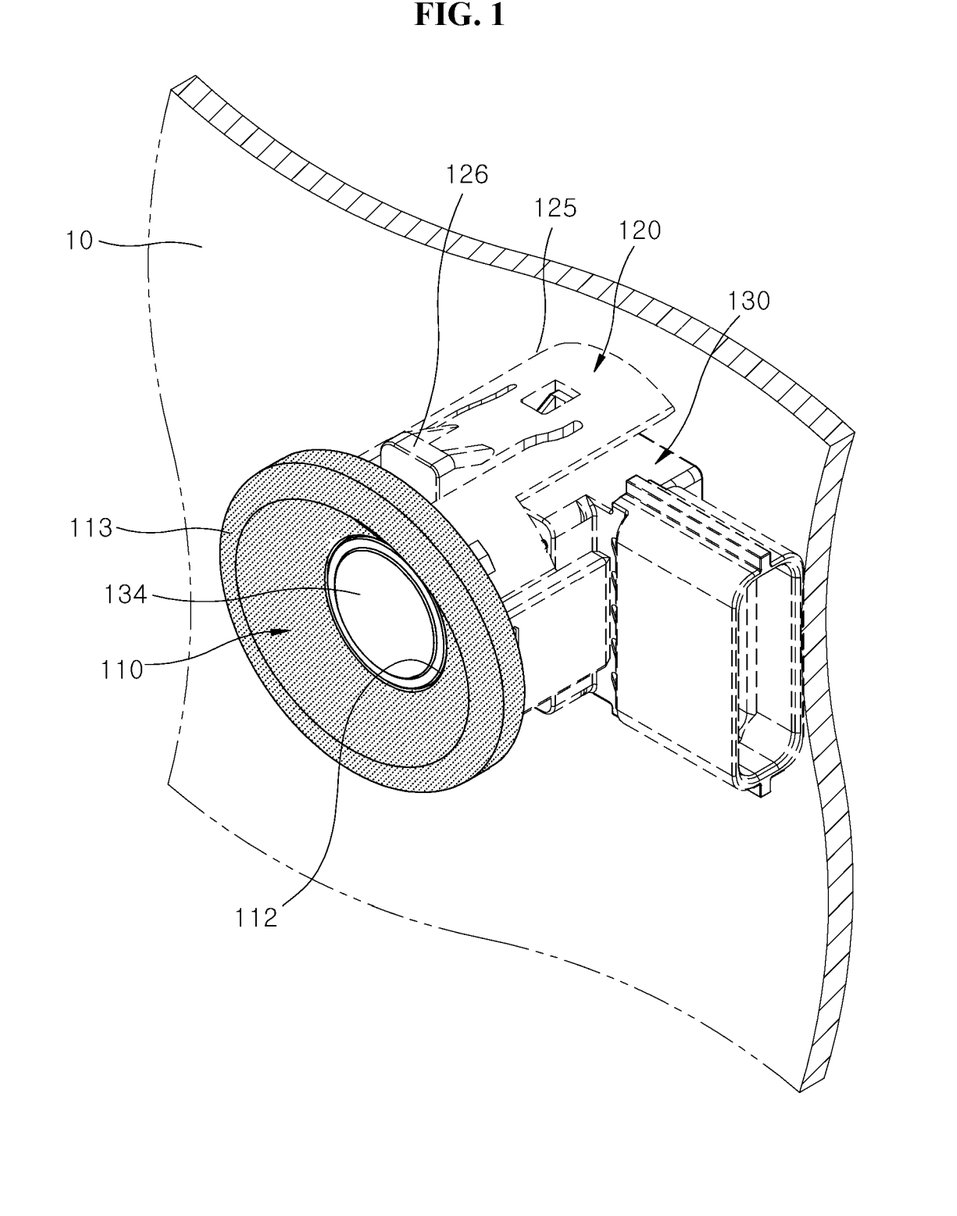
FIG. 1 is a perspective view illustrating a sensor apparatus for a vehicle installed in a deck accord according to some exemplary embodiments.
Figure 2:
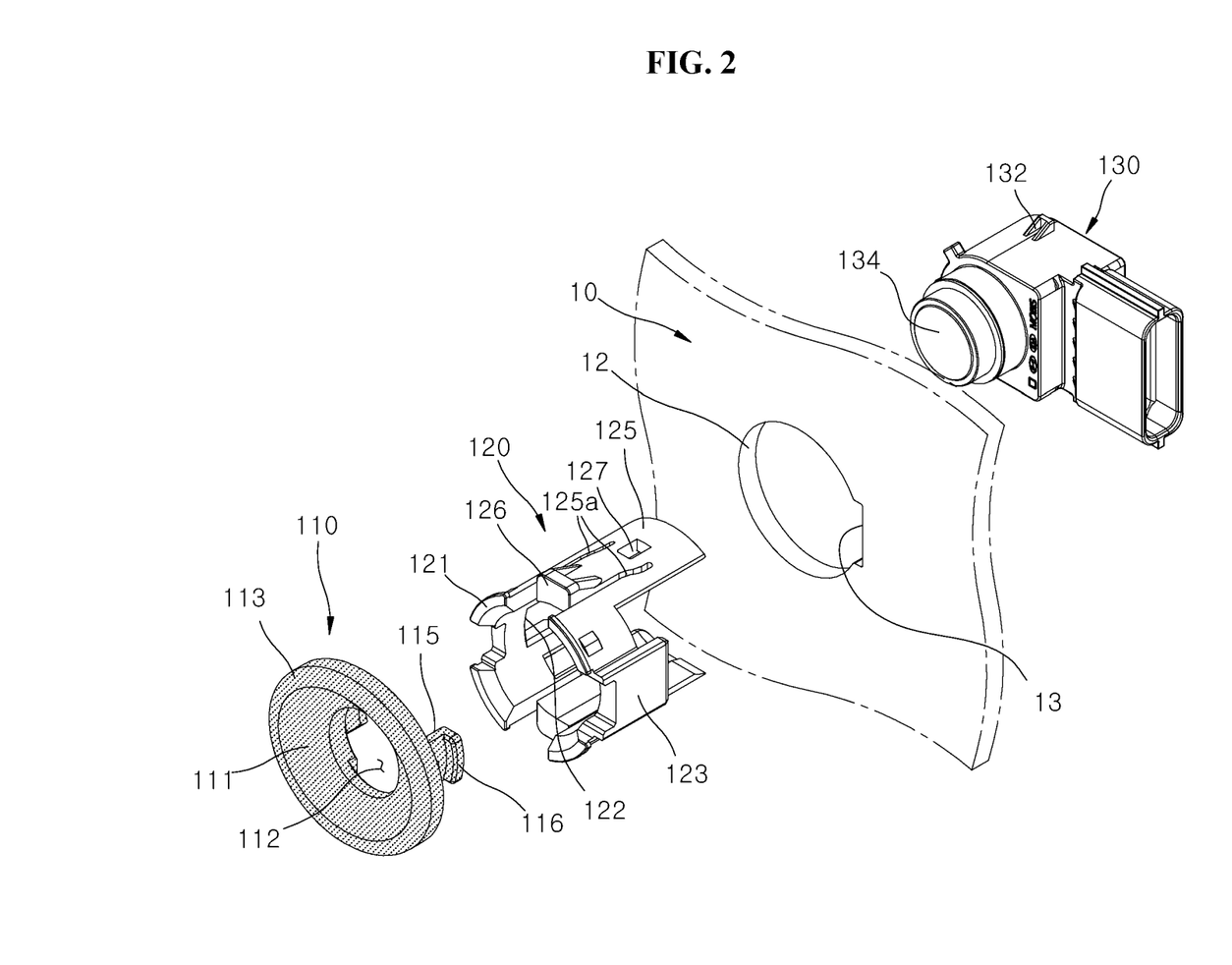
FIG. 2 is an exploded perspective view illustrating a position where the sensor apparatus for a vehicle of FIG. 1 is inserted in the deck according to some exemplary embodiments.
Figure 3:
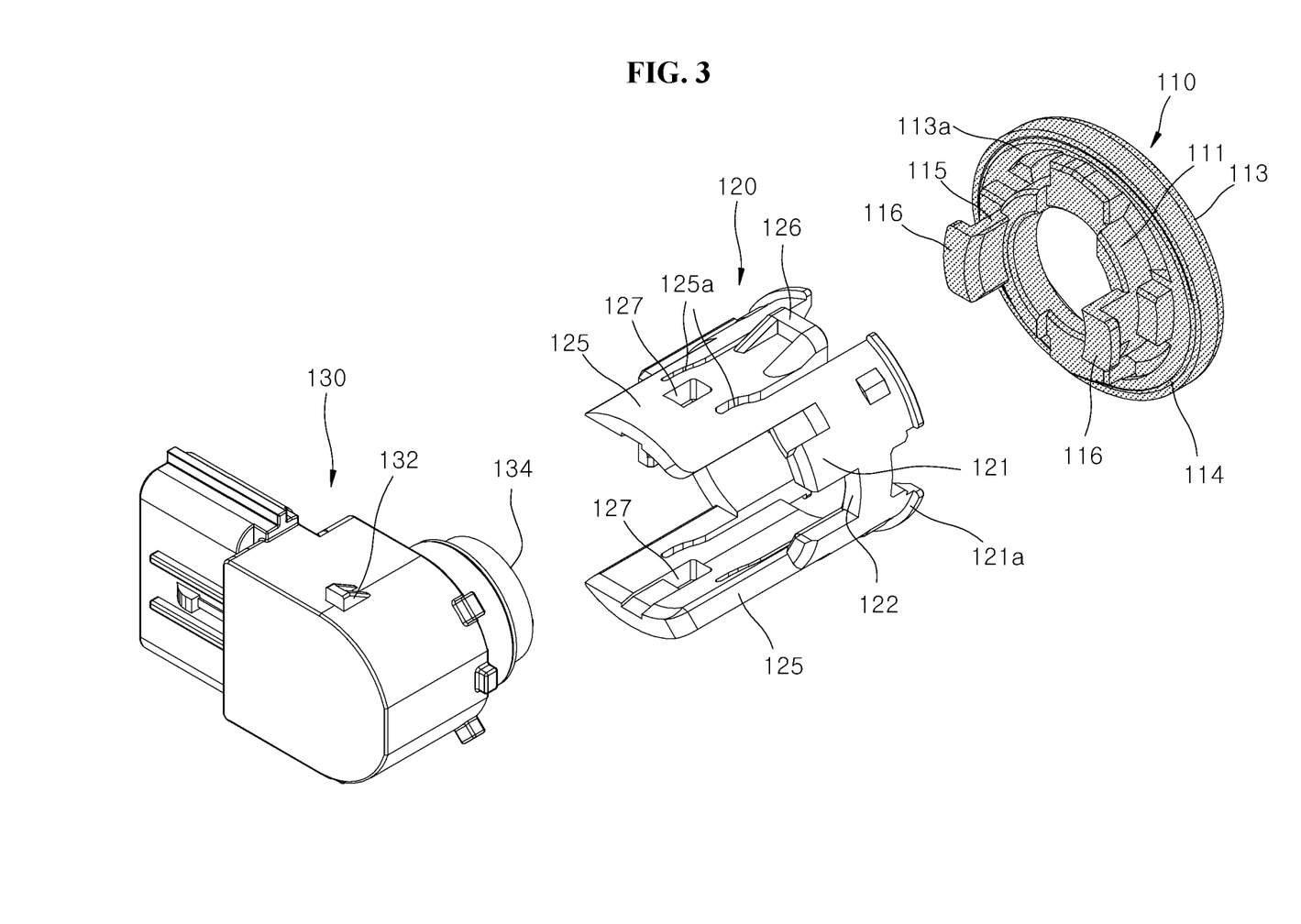
FIG. 3 is an exploded perspective view illustrating the sensor apparatus for a vehicle of FIG. 1 according to some exemplary embodiments.
Figure 4:
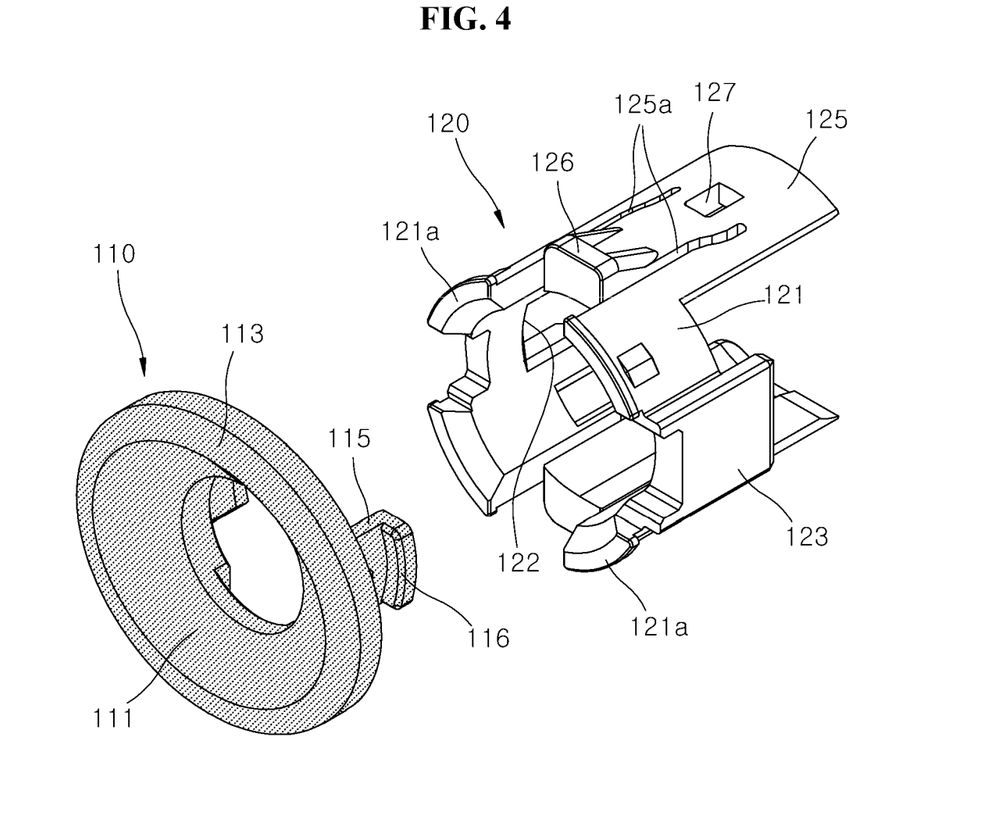
FIG. 4 is a perspective view illustrating a protector and a holder of the sensor apparatus for a vehicle of FIG. 1 according to some exemplary embodiments.
Figure 5:
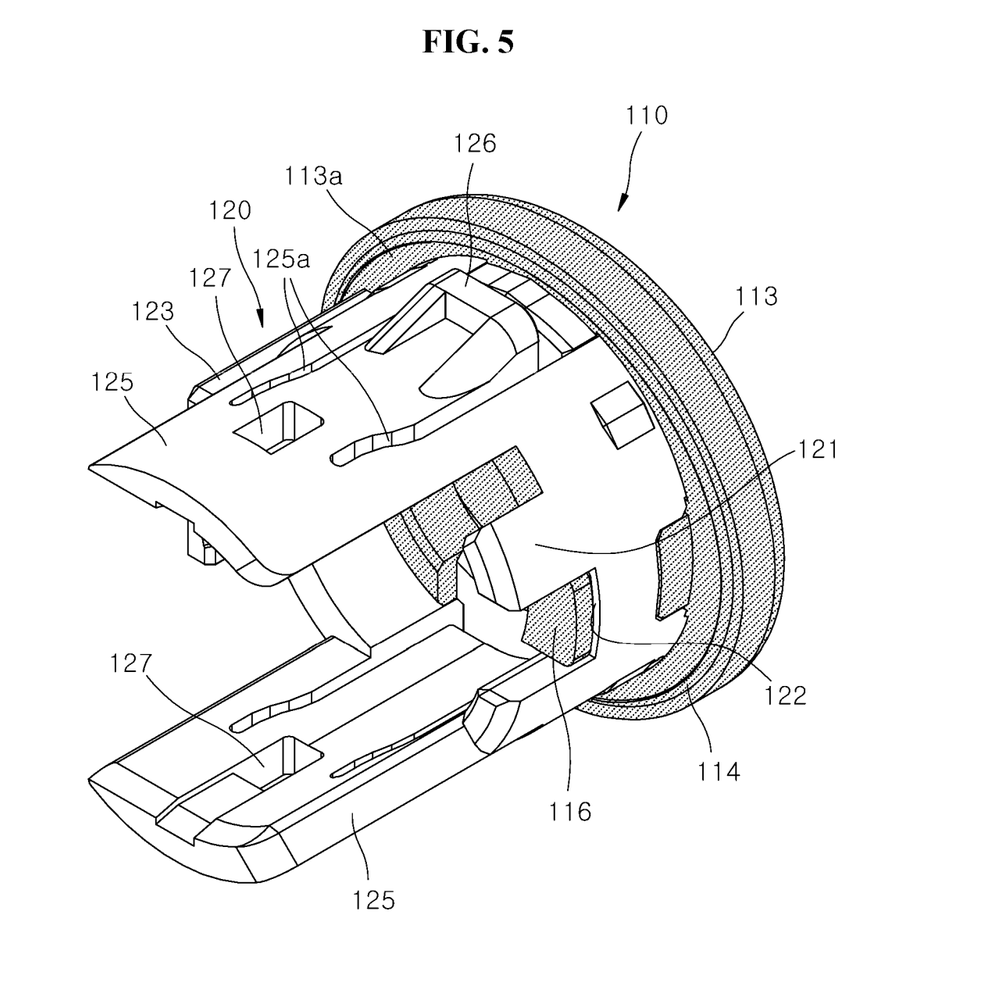
FIG. 5 is a perspective view illustrating the protector and the holder coupled to each other in the sensor apparatus for a vehicle of FIG. 1 according to some exemplary embodiments.
Figure 6:
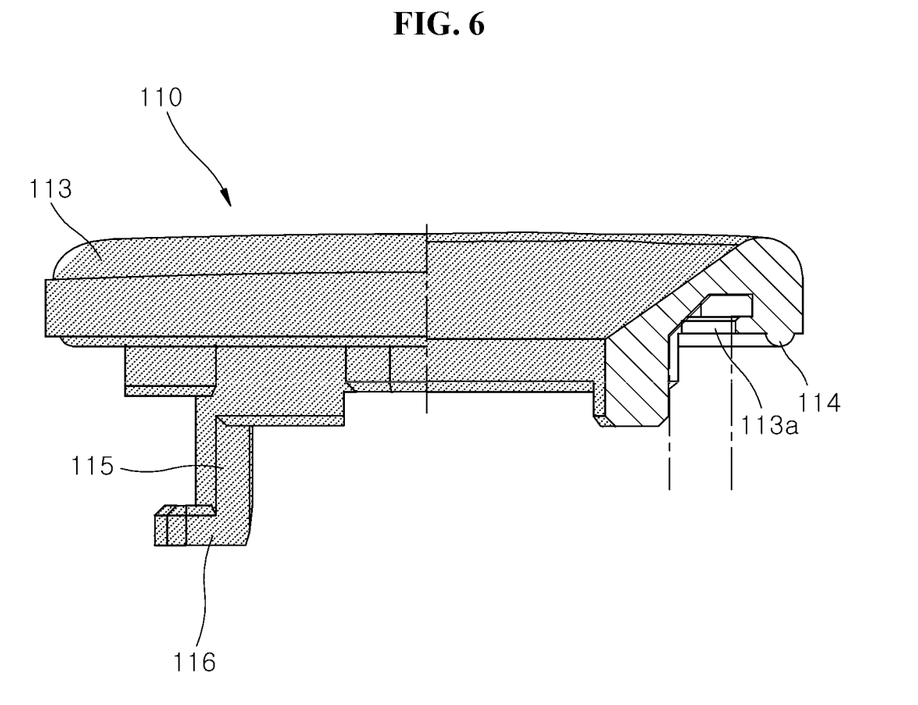
FIG. 6 is a cross-sectional view illustrating the protector in the sensor apparatus for a vehicle of FIG. 1 according to some exemplary embodiments.

FIG. 1 is a perspective view illustrating a sensor apparatus for a vehicle installed in a deck accord according to some exemplary embodiments. FIG. 2 is an exploded perspective view illustrating a position where the sensor apparatus for a vehicle of FIG. 1 is inserted in the deck according to some exemplary embodiments. FIG. 3 is an exploded perspective view illustrating the sensor apparatus for a vehicle of FIG. 1 according to some exemplary embodiments. FIG. 4 is a perspective view illustrating a protector and a holder of the sensor apparatus for a vehicle of FIG. 1 according to some exemplary embodiments. FIG. 5 is a perspective view illustrating the protector and the holder coupled to each other in the sensor apparatus for a vehicle of FIG. 1 according to some exemplary embodiments. FIG. 6 is a cross-sectional view illustrating the protector in the sensor apparatus for a vehicle of FIG. 1 according to some exemplary embodiments.

Referring to FIGS. 1 to 6, a sensor apparatus for a vehicle according to some exemplary embodiments may include a protector 110, a holder 120, and a sensor 130.

A deck 10 may be installed at the front and rear of a vehicle so as to constitute a bumper. The deck 10 may be formed of a metallic material, but exemplary embodiments are not limited thereto. The deck 10 may have an insertion hole 12 through which the sensor apparatus is installed. The insertion hole 12 may be formed in a circular shape. The insertion hole 12 may have at least one position decision groove 13 formed in a concave shape. The protector 110 and the holder 120 may be inserted at the outer surface of the deck 10, and the sensor 130 may be coupled at the inner surface of the deck 10.

The protector 110 may be inserted into the insertion hole 12 of the deck 10, and may have a protector hook 116 formed thereon. The sensor 130 may have a front portion 134 inserted into the protector 110, and the protector 110 may have a through-hole 112 through which, for instance, ultrasonic waves are irradiated.

The holder 120 may be inserted into the insertion hole 12, coupled to the protector 110 so as to be constrained by the protector hook 116, and have a plurality of holder hooks 126 formed so as to be hooked to the inner surface of the deck 10. The holder 120 may support the protector 110 and the sensor 130.

The sensor 130 may be coupled to the holder 120. The sensor 130 may have one or more sensor hooks 132 formed on an outer surface thereof so as to be hooked to the holder 120. The sensor 130 may irradiate, for instance, light or ultrasonic waves to sense an external object. As the sensor 130, an ultrasonic sensor may be applied.

According to various exemplary embodiments, since the sensor apparatus for a vehicle includes the protector 110, the holder 120, and the sensor 130, the number of parts and assembling processes in the sensor apparatus may be reduced. Furthermore, since the protector 110 is coupled to the holder 120, the assembly of the protector 110 and the holder 120 can be inserted into the insertion hole 12 of the deck 10, and the sensor 130 can be coupled to the holder 120 on an opposite side of the protector 110, and, as such, the time required for assembling the sensor apparatus may be shortened. Further, since the protector 110, the holder 120, and the sensor 130 are assembled to the deck 10 through hook coupling, a bolt and a nut may be omitted. Furthermore, not only can a process of welding a bolt to the deck 10 be omitted, but an assembly defect and assembly tolerance of a bolt and a nut can be prevented. In addition, the assembly of the protector 110 and the holder 120 may be inserted into the insertion hole 12 at the outer surface of the deck 10, and the sensor 130 may be coupled to the holder 120 at the inner surface of the deck 10. Therefore, the assembling process of the sensor apparatus for a vehicle can be simplified, and the assembling time can be shortened.

The protector 110 may include a protector body 111, a protector ring 113, and a plurality of protector extension ribs 115.

The protector body 111 may be inserted into the insertion hole 12, and coupled to the holder 120. The protector body 111 may be formed in a circular ring shape corresponding to the insertion hole 12.

The protector ring 113 may be formed in a ring shape on the protector body 111 so as to be contacted with the outer surface of the deck 10. Since the protector ring 113 is contacted with the inner surface of the deck 10, the protector ring 113 may be locked to the circumference of the insertion hole 12 when the protector 110 is inserted into the insertion hole 12. Thus, the protector 110 can be prevented from being passed through the insertion hole 12.

The protector ring 113 may protrude more forward than the sensor 130 to protect the front portion 134 of the sensor 130. The protector ring 113 may be formed in a ring shape in the circumferential direction. Since the protector ring 113 protrudes more forward than the front portion 134 of the sensor 130, the front portion 134 of the sensor 130 can be prevented from being hit or damaged by foreign matter, such as gravel, sand, etc.

The plurality of protector extension ribs 115 may be extended from the protector body 111 toward the opposite side of the protector ring 113 in the axial direction, and the protector hook 116 may be formed on each of the protector extension ribs 115. The plurality of protector extension ribs 115 may be arranged at even intervals in the circumferential direction of the protector body 111, but exemplary embodiments are not limited thereto. Since the protector hook 116 is hooked to and constrained by the holder 120, the holder 120 can be prevented from being separated from the protector hook 116.

The protector 110 may be formed of an elastic material, and the protector ring 113 may have one or more tolerance removal ribs 114 so as to be elastically deformed depending on the thickness of the deck 10. The tolerance removal rib 114 may be formed in a ring shape along the circumference of the protector ring 113. In some exemplary embodiments, the plurality of tolerance removal ribs 114 may be formed to form concentric circles with the protector ring 113. The tolerance removal rib 114 may have a height slightly larger than a design value.

The protector ring 113 may have the tolerance removal ribs 114 so as to be elastically deformed depending on the thickness t1 or t2 (see FIGS. 9 to 11) of the deck 10. Therefore, although the thickness of the deck 10 is slightly different when the protector 110 is assembled to the holder 120, the tolerance removal ribs 114 may be elastically deformed to remove assembly tolerance depending on a thickness difference of the deck 10. For example, although the thickness of the deck 10 may be changed depending on the type of the vehicle, the tolerance removal rib 114 may be elastically deformed depending on the thickness of the deck 10, thereby removing the assembly tolerance depending on the thickness difference of the deck 10. It is noted that the tolerance removal rib 114 may be contracted when the thickness of the deck 10 is relatively large, and expanded when the thickness of the deck 10 is relatively small.

According to various exemplary embodiments, since the tolerance removal rib 114 is elastically deformed when the protector 110 is assembled to the holder 120, a gap between the protector ring 113 and the outer surface of the deck 10 may be sealed by the tolerance removal rib 114. Therefore, it is possible to prevent moisture and/or foreign matter from permeating through the gap between the protector ring 113 and the outer surface of the deck 10. Furthermore, there may be no need to install a sealing member between the protector 110 and the deck 10, and the sensor 130 can be prevented from being contaminated and/or damaged by moisture and/or foreign matter.

The holder 120 may include a holder body 121 and a plurality of holder extension ribs 125.

The holder body 121 may be coupled to the protector body 111, and include a plurality of holder hook grooves 122 to which the protector hooks 116 are hooked. The holder body 121 may be formed in a ring shape so as to be inserted into the insertion hole 12. Since the protector hooks 116 are hooked to the holder hook grooves 122, the protector 110 can be prevented from being separated from the holder 120.

The plurality of holder extension ribs 125 may be extended from the holder body 121 to the opposite side of the protector 110 in the axial direction, and have the respective holder hooks 126 formed thereon. The holder hook 126 may have a vertical surface formed at the front of the holder hook 126 and a tapered portion formed on the outside of the holder hook 126. The tapered portion may be inclined downward toward the rear of the holder hook 126. Since the plurality of holder extension ribs 125 are extended from the holder body 121 and have the respective holder hooks 126 formed thereon, the plurality of holder hooks 126 may stably support the inner surface of the deck 10 when the protector 110 and the holder 120 are assembled into the insertion hole 12.

Since the plurality of holder hooks 126 support the inner surface of the deck 10 with the tolerance removal rib 114 elastically deformed at the outer surface of the deck 10, the elastic force of the protector ring 113 and the support force of the holder hooks 126 may be applied to the deck 10. Therefore, the protector ring 113 and the holder hook 126 can prevent a clearance from the deck 10.

The holder extension rib 125 may have a holder slit 125a formed at the circumference (e.g., upper and lower surfaces, as well as extending in both sides of the upper and lower surfaces) of the holder hook 126 such that the holder hook 126 is elastically deformed. The holder slit 125a may be formed approximately in a U-shape. Since the circumference of the holder hook 126 is separated from the holder extension rib 125 by the holder slit 125a, the holder hook 126 may be deformed toward the center of the holder 120 and inserted into the insertion hole 12. After being inserted into the insertion hole 12, the holder hook 126 may be restored toward the outside of the holder 120 and supported by the inner surface of the deck 10. As such, the holder 120 may be easily assembled into the insertion hole 12, and prevented from being separated from the insertion hole 12 after the assembling of the holder 120.

The holder extension rib 125 may have a holder constraint groove 127 by which the sensor hook 132 is constrained. The holder extension rib 125 may have one or more holder constraint grooves 127 formed therein. When the sensor 130 is coupled to the holder 120, the sensor hook 132 may be constrained by the holder constraint groove 127, and thus, prevent the sensor 130 from being separated from the holder 120.

The holder 120 may have a locking protrusion 121a formed at a front end thereof, and the protector ring 113 may have a constraint protrusion 113a formed on the inner surface thereof, with the constraint protrusion 113a protruding toward the center of the holder 120. Since the constraint protrusion 113a is overlapped and constrained by the locking protrusion 121a when the protector 110 is coupled to the holder 120, the protector 110 may be more reliably coupled to the holder 120.

The holder body 121 may have a position decision rib 123 formed thereon so as to be inserted into the position decision groove 13 of the insertion hole 12. The position decision rib 123 may be formed in parallel to the axial direction of the holder 120. The position decision rib 123 may protrude from the holder body 121 to the outside. Since the position decision rib 123 is inserted into the position decision groove 13 when the holder 120 is inserted into the insertion hole 12, the insertion position of the holder 120 can be prevented from being changed and ensure a particular installation orientation. Furthermore, since the holder 120 is inserted into the insertion hole 12 at a constant position, the assembly position of the sensor 130 can be constantly maintained.

The assembling process of the sensor apparatus for a vehicle according to some exemplary embodiments, which is configured as described above, will be described below.

Figure 7:
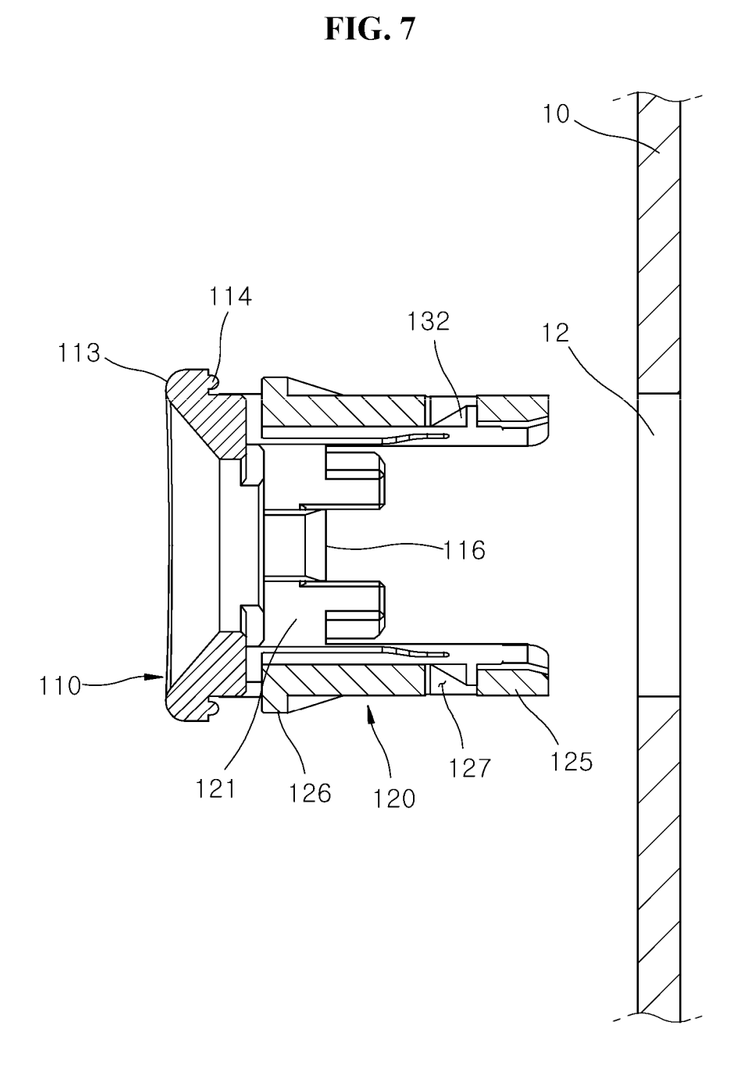
FIG. 7 is a cross-sectional view illustrating the protector and the holder coupled in the sensor apparatus for a vehicle of FIG. 1 according to some exemplary embodiments.
Figure 8:
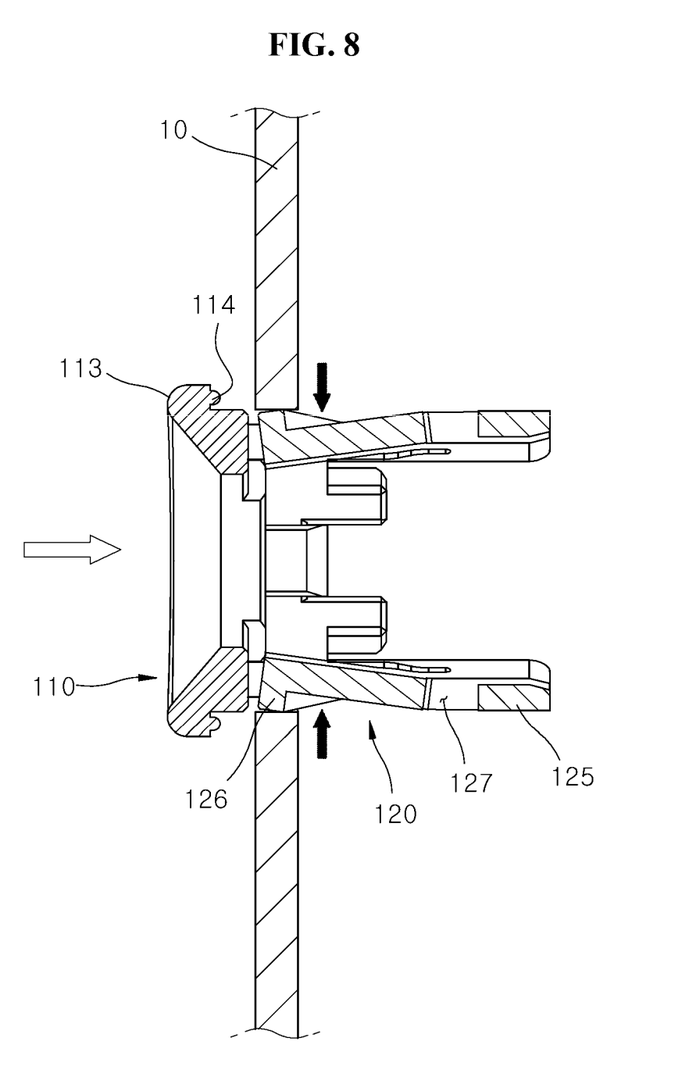
FIG. 8 is a cross-sectional view illustrating the assembly of the protector and the holder inserted into an insertion hole of the deck in the sensor apparatus for a vehicle of FIG. 1 according to some exemplary embodiments.
Figure 9:
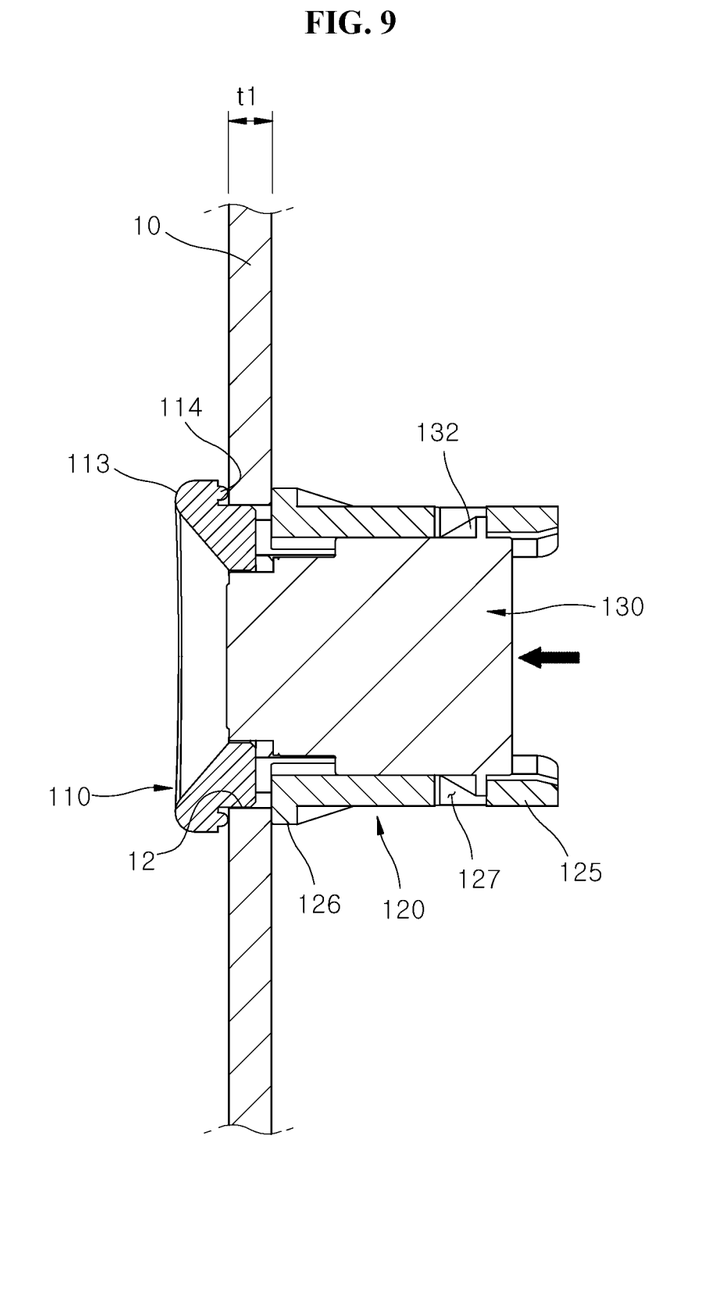
FIG. 9 is a cross-sectional view illustrating the sensor being coupled after the assembly of the protector and the holder is inserted into the insertion hole of the deck in the sensor apparatus for a vehicle of FIG. 1 according to some exemplary embodiments.
Figure 10:
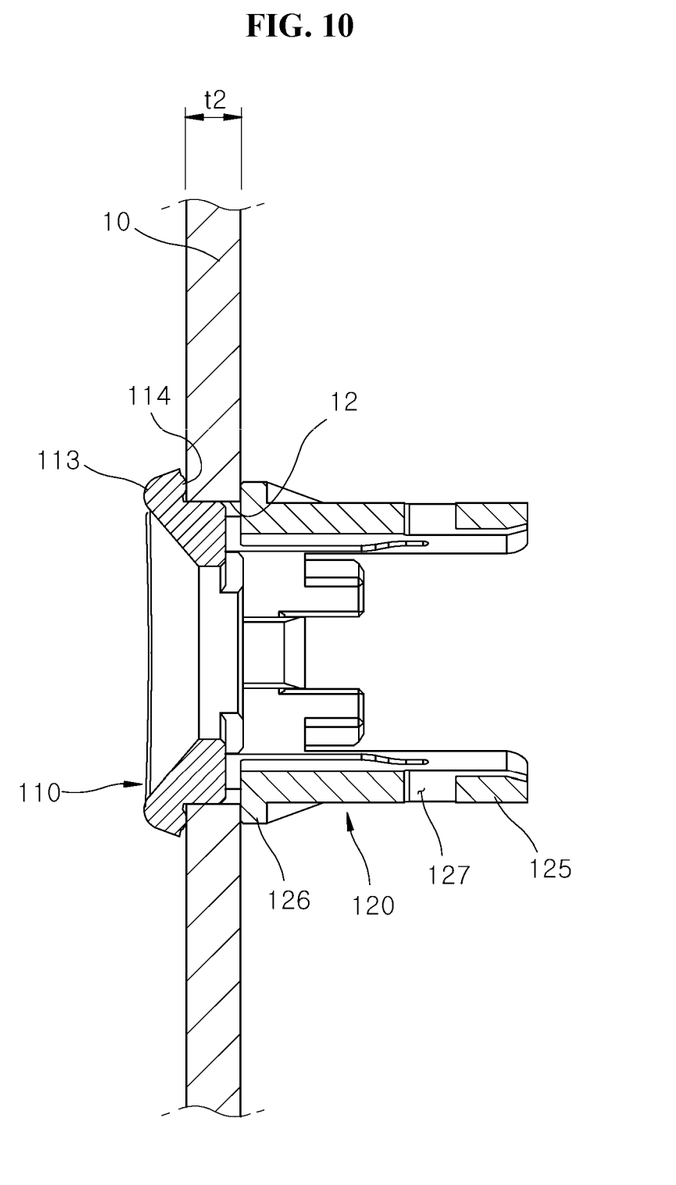
FIG. 10 is a cross-sectional view illustrating the assembly of the protector and the holder being inserted into an insertion hole of a deck having a relatively large thickness in the sensor apparatus for a vehicle of FIG. 1 according to some exemplary embodiments.
Figure 11:
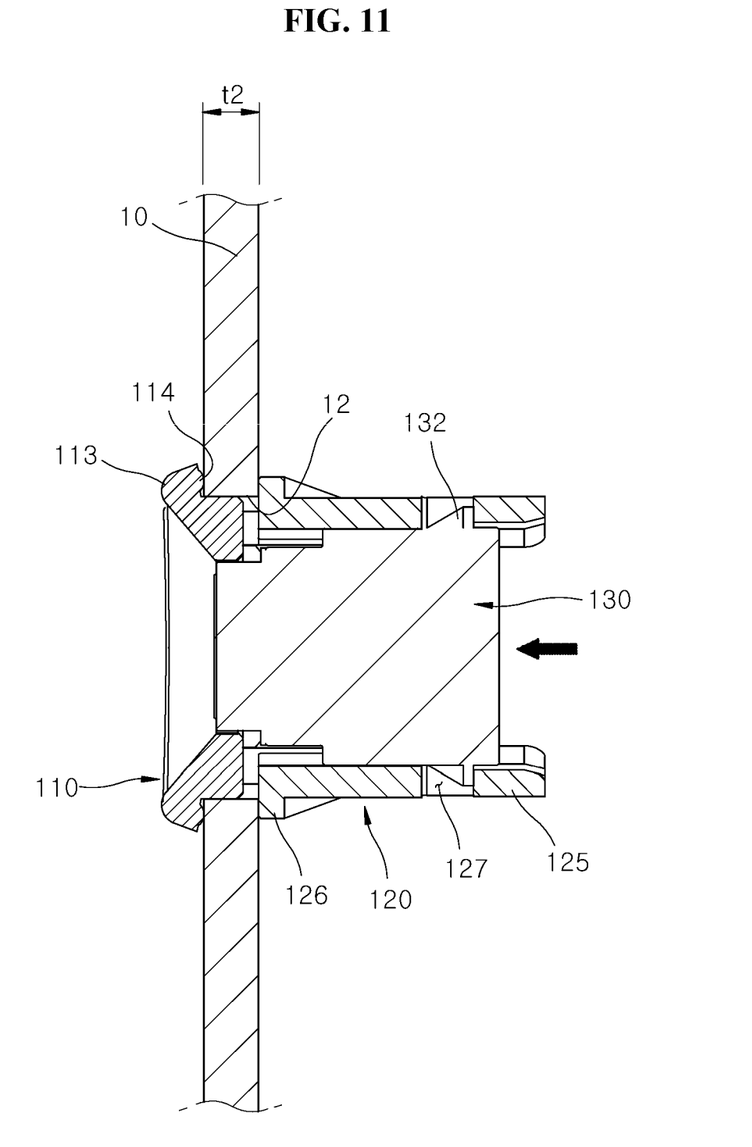
FIG. 11 is a cross-sectional view illustrating the sensor being coupled after the assembly of the protector and the holder is inserted into an insertion hole of a deck having a relatively large thickness in the sensor apparatus for a vehicle of FIG. 1 according to some exemplary embodiments.

FIG. 7 is a cross-sectional view illustrating the protector and the holder coupled in the sensor apparatus for a vehicle of FIG. 1 according to some exemplary embodiments. FIG. 8 is a cross-sectional view illustrating the assembly of the protector and the holder inserted into an insertion hole of the deck in the sensor apparatus for a vehicle of FIG. 1 according to some exemplary embodiments. FIG. 9 is a cross-sectional view illustrating the sensor being coupled after the assembly of the protector and the holder is inserted into the insertion hole of the deck in the sensor apparatus for a vehicle of FIG. 1 according to some exemplary embodiments. FIG. 10 is a cross-sectional view illustrating the assembly of the protector and the holder being inserted into an insertion hole of a deck having a relatively large thickness in the sensor apparatus for a vehicle of FIG. 1 according to some exemplary embodiments. FIG. 11 is a cross-sectional view illustrating the sensor being coupled after the assembly of the protector and the holder is inserted into an insertion hole of a deck having a relatively large thickness in the sensor apparatus for a vehicle of FIG. 1 according to some exemplary embodiments.

Referring to FIGS. 7 to FIG. 11, the protector 110 may be coupled to the holder 120. At this time, since the protector hook 116 of the protector 110 is hooked to and constrained by the holder hook groove 122 of the holder 120, the protector 110 may be reliably coupled to the holder 120.

After the protector 110 is coupled to the holder 120, the assembly of the protector 110 and the holder 120 may be inserted into the insertion hole 12 at the front of the deck 10. At this time, when the holder hook 126 is pressed by the circumference of the insertion hole 12, the holder hook 126 may be deformed toward the center of the holder body 121. At this time, since the holder hook 126 has the tapered portion formed on the outside thereof, the holder hook 126 may be smoothly inserted into the insertion hole 12.

When the holder 120 is completely inserted into the insertion hole 12, the holder hook 126 may be released from the pressing force by the circumference of the insertion hole 12, and restored toward the outside of the holder extension rib 125.

When the holder 120 is elastically deformed to the outside and completely restored, the vertical surface of the holder hook 126 may be supported by the internal surface of the deck 10. At this time, since the protector ring 113 is pulled toward the inner surface of the deck 10 by the holder hook 126, the tolerance removal rib 114 of the protector ring 113 may be pressed against the outer surface of the deck 10 (see FIG. 9).

When the deck 10 has a large thickness t1 or t2 depending on manufacturing tolerance or a vehicle type, the tolerance removal rib 114 may be elastically deformed and pressed against the deck 10 (see FIGS. 10 and 11). Since the tolerance removal rib 114 is elastically deformed depending on the thickness of the deck 10, an interval between the end of the tolerance removal rib 114 and the vertical surface of the holder hook 126 may be changed. When the deck 10 has a relatively large thickness, the tolerance removal rib 114 may be elastically deformed and pressed against the deck 10 that makes it possible to remove tolerance depending on a thickness difference of the deck 10.

Since the plurality of holder hooks 126 support the inner surface of the deck 10 with the tolerance removal rib 114 elastically deformed at the outer surface of the deck 10, the elastic force of the protector ring 113 and the support force of the holder hook 126 may be applied to the deck 10. Therefore, it is possible to prevent an occurrence of clearance between the holder hook 126 and the deck 10.

After the protector 110 and the holder 120 are inserted into the insertion hole 12, the sensor 130 may be coupled to the holder 120. At this time, since the sensor hook 132 is constrained by the holder constraint groove 127, the sensor 130 can be prevented from being separated from the holder 120.

Since the sensor apparatus for a vehicle is constituted by the protector 110, the holder 120, and the sensor 130, the number of parts in the sensor apparatus for a vehicle and the manufacturing cost and time of the sensor apparatus for a vehicle can be reduced.

The protector 110 and the holder 120 may be assembled and inserted into the insertion hole 12, and the sensor 130 may be assembled to the holder 120. Therefore, it is possible to reduce the number of assembling processes and the assembling time of the sensor apparatus for a vehicle.

Since the assembly of the protector 110 and the holder 120 is inserted into the insertion hole 12 and fixed to the deck 10, a separate bolt and a separate nut do not need to be installed, and a bolt does not need to be welded to the deck 10 to install the sensor apparatus for a vehicle in the deck 10. Therefore, the assembling process of the sensor apparatus for a vehicle can be simplified.

Since the protector ring 113 has the tolerance removal rib 114, which is elastically deformed depending on the thickness of the deck 10, the tolerance removal rib 114 may be elastically deformed even though the deck 10 has a slightly different thickness when the protector 110 is assembled to the holder 120. Therefore, the assembly tolerance depending on the thickness difference of the deck 10 can be removed, and the gap between the deck 10 and the protector ring 113 can be sealed.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:
1. A sensor apparatus for a vehicle, comprising:
a protector inserted into an insertion hole of a deck of the vehicle, the protector comprising protector hooks formed thereon;
a holder inserted into the insertion hole and coupled to the protector so as to be constrained by the protector hooks, the holder comprising holder hooks formed so as to be hooked to an inner surface of the deck; and a sensor coupled to the holder.

2. The sensor apparatus of claim 1, wherein the protector comprises:

a protector body inserted into the insertion hole and coupled to the holder;

a protector ring formed in a ring shape on the protector body so as to be contacted with an outer surface of the deck; and protector extension ribs extended from the protector body to an opposite side of the protector ring, each of the protector extension ribs comprising a protector hook among the protector hooks formed thereon.

3. The sensor apparatus of claim 2, wherein the protector body comprises a through-hole into which a front portion of the sensor is inserted.

4. The sensor apparatus of claim 3, wherein the protector ring protrudes further from the outer surface of the deck than the front portion of the sensor to protector the sensor.

5. The sensor apparatus of claim 2, wherein:

the protector ring comprises one or more tolerance removal ribs, which are elastically deformable; and an extent of deformation of the one or more tolerance removal ribs is at least dependent on a thickness of the deck.

6. The sensor apparatus of claim 5, wherein the one or more tolerance removal ribs is formed in a ring shape along a circumference of the protector ring.

7. The sensor apparatus of claim 2, wherein the holder comprises:

a holder body to which the protector body is coupled, the holder body comprising holder hook grooves to which the protector hooks are respectively hooked; and holder extension ribs extended from the holder body to the opposite side of the protector ring, each of the holder extension ribs comprising a holder hook among the holder hooks formed thereon.

8. The sensor apparatus of claim 7, wherein each of the holder extension ribs comprises a holder slit formed around the holder hook such that the holder hook is configured to elastically deform.

9. The sensor apparatus of claim 8, wherein the holder slit is formed in a U-shape to surround the holder hook.

10. The sensor apparatus of claim 8, wherein:

the sensor comprises one or more sensor hooks protruding from an outer surface thereof; and each of the holder extension ribs comprises one or more holder constraint grooves to constrain the one or more sensor hooks.

11. The sensor apparatus of claim 8, wherein:

the insertion hole of the deck comprises one or more concave position decision grooves formed therein; and the holder body comprises one or more position decision ribs configured to be inserted into the one or more position decision grooves of the insertion hole.

12. The sensor apparatus of claim 1, wherein:

the protector is coupled to the holder and inserted into the insertion hole of the deck; and the sensor is coupled to the holder on an opposite side of the protector.

* * * * *